July 24, 1956  W. F. SCHEEL  2,755,890
PNEUMATIC BRAKE
Filed Dec. 10, 1951  2 Sheets-Sheet 1
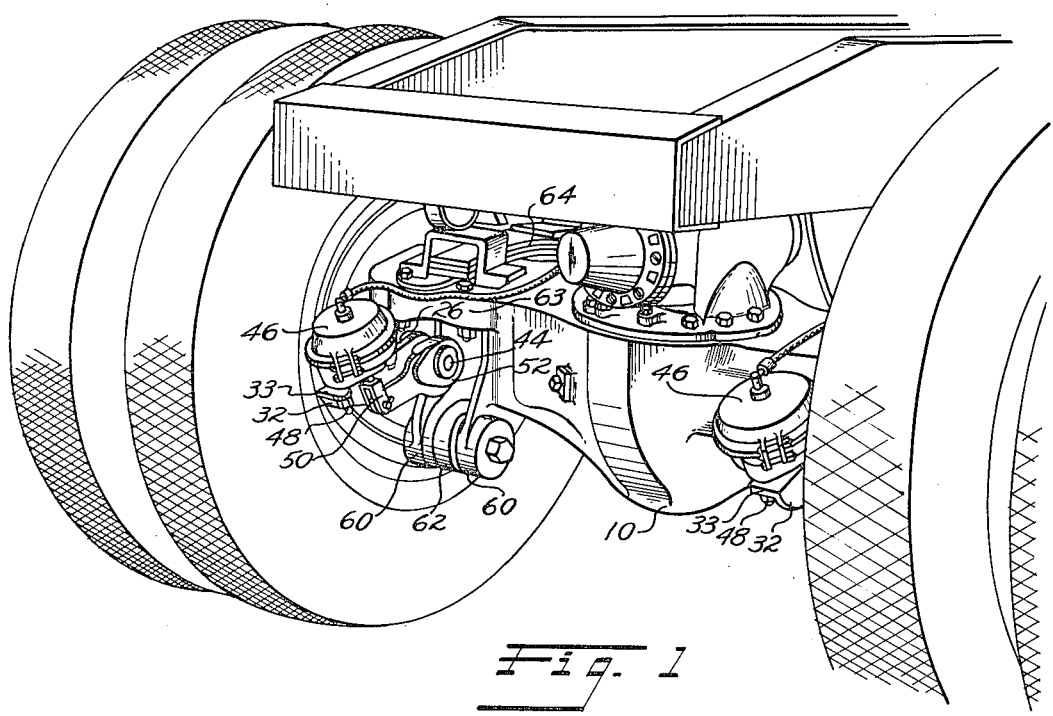
Fig. 1
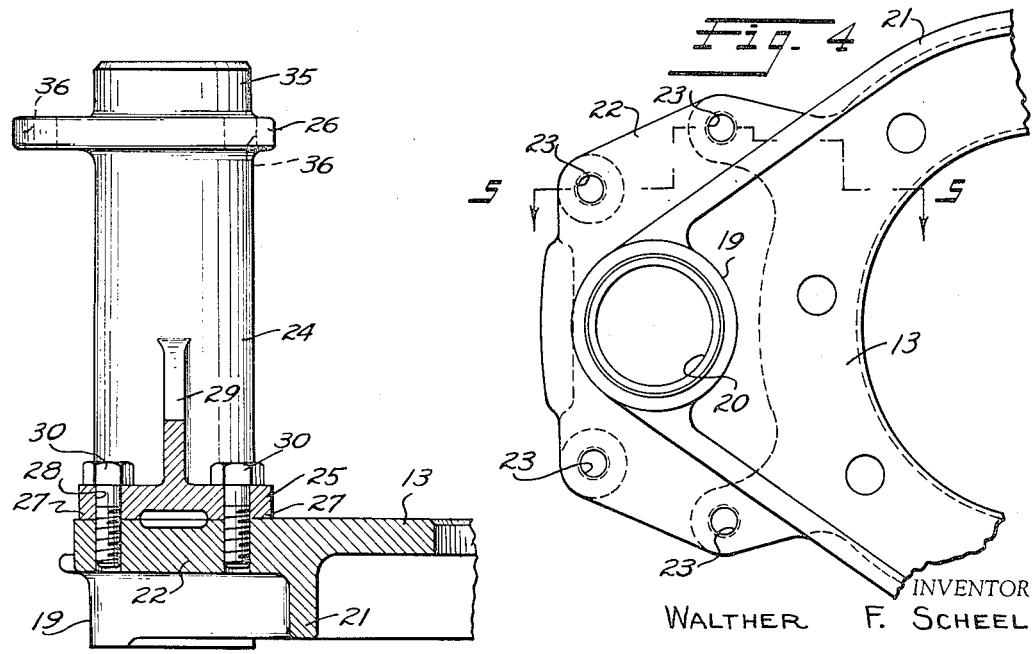
Fig. 4
Fig. 5
INVENTOR
WALTHER F. SCHEEL
BY Strauch, Nolan & Diggins
ATTORNEYS

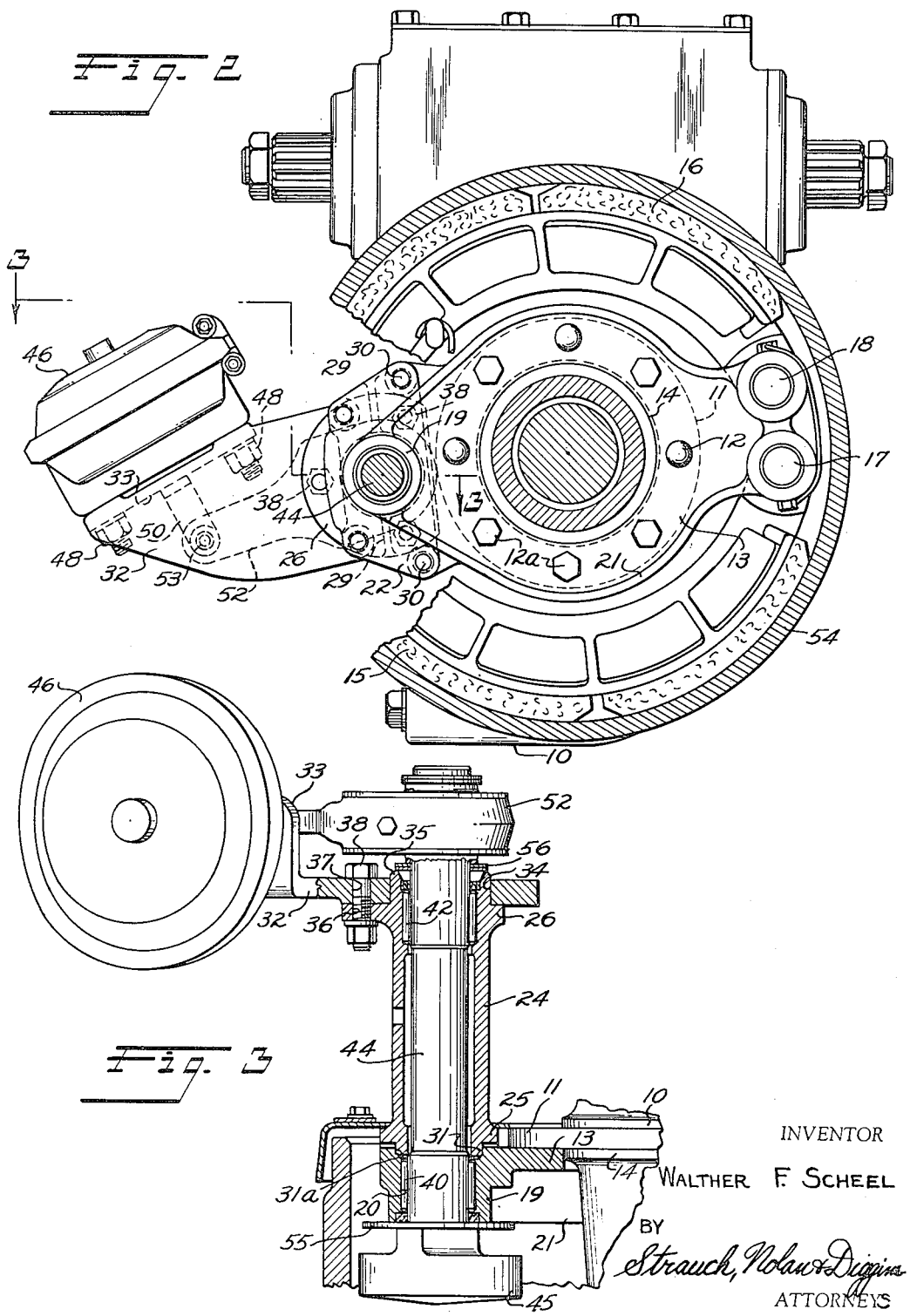

United States Patent Office 2,755,890
Patented July 24, 1956

2,755,890

PNEUMATIC BRAKE

Walther F. Scheel, Detroit, Mich., assignor, by mesne assignments, to Rockwell Spring and Axle Company, Coraopolis, Pa., a corporation of Pennsylvania Application December 10, 1951, Serial No. 260,884

6 Claims. (Cl. 188—152)

This invention relates to improvements in vehicle brake actuating mechanisms and is directed to novel mounting structures by which the cam shaft, its operating linkage, and an air or other fluid pressure powered motor may be mounted at varying distances from the wheel within the longitudinally projected profile of the axle housing and without interference with the spring or other undergear of the vehicle.

This invention in particular comprises the provision of special brackets mounted in a novel manner upon an axle mounted brake support that carries the brake shoes and associated parts, which brackets support the fluid pressure motor, the brake cam shaft and the actuating connections therebetween.

In recent years, much effort has been spent in trying to develop a satisfactory mounting structure for the fluid motor, the cam shaft, and the associated interconnecting linkage of fluid powered, cam actuated brake mechanisms of heavy duty vehicles.

The problems which must be solved in such mounting structures are numerous. One of the major problems in such mountings is the location of the fluid motor in such a position that it cannot be damaged by obstacles in the path of the vehicle. A second problem has been the mounting of the fluid motor in such a manner that the cam shaft of the actuating mechanism is not subject to deflection when the brakes are energized. A third problem is the mounting of the fluid motor and associated linkage in such a manner that the cam shaft bearings are accurately axially aligned and so that the cam shaft axis is properly located relative to the brake shoes. A still further problem is that the fluid motor of such actuating mechanisms must be so mounted that there is no interference with the spring suspension or with the axle stabilization linkages.

Due to the many various forms of axles and stabilization mechanisms therefor, it has been necessary in the past to provide an entirely different mounting structure for each of the various forms of axles and associated stabilization mechanisms rather than providing mounting structures which are of general applicability.

This problem will best be understood by a brief review of the recent developments in such mounting structures in reference to several patents. United States Letters Patent No. 2,331,652, which was issued October 12, 1943, to L. R. Buckendale, discloses a brake mechanism in which fluid actuated motors and associated linkages are located in such a position relative to the axle housing that they are to a large extent protected from damage by road obstacles in the path of the vehicles. This structure, however, has certain disadvantages. The fluid motors of such mechanism being mounted upon the axle, actuation of the brake may cause angular deflection of the axle housing outer ends relative to the central portion upon which the motors are mounted. As a result of this slight angular deflection, misalignment of the cam shaft bearings and deflection of the cam shaft is produced. In order to overcome the disadvantages resulting from this angular deflection of the axle, mounting structures have been devised for the fluid motor, cam shaft, and interconnecting linkage which are supported solely by the brake mounting bracket or spider. Examples of such mounting structures will be found in U. S. Patent No. 2,409,908, issued October 22, 1946, to I. W. Simpkins; Patent No. 2,516,160, issued July 25, 1950, to R. K. Super; Patent No. 2,527,528, issued October 31, 1950, to L. R. Buckendale; and in co-pending application Serial No. 72,287, filed January 24, 1949, by L. R. Buckendale and which has matured into United States Letters Patent No. 2,619,202 dated November 25, 1952, for Spider Mounted Brackets for Air Brakes. Each of the mounting structures disclosed in these patents solves certain of these problems and is reasonably satisfactory for the particular form of vehicle for which it was designed, but each of these structures fails to solve more than one or two of these mounting problems and none are of general applicability. Thus, it has been necessary heretofore to maintain in stock a large number of different types of brake actuating mechanism mounting brackets to accommodate the various forms of axles and stabilizing mechanism.

In the operation of large fleets of vehicles including vehicles having undercarriage structures of various forms, the necessity of maintaining a stock pile of different types of these mounting brackets wastes much space in storerooms and ties up capital which could otherwise be more fruitfully invested.

It is, accordingly, a primary object of my invention to provide an improved mounting structure for the fluid motor cam shaft, and interconnecting linkage of a fluid pressure actuated brake mechanism which is more generally applicable to vehicles despite the many forms of axle structures and axle stabilization mechanism than those heretofore known in the art and which in addition eliminates the problems of deflection of the cam shaft, misalignment of the cam shaft bearings, and the danger of injury to the fluid motor by obstacles present in the road.

More specifically it is an object of my invention to provide an improved brake actuating mechanism mounting structure for cam actuated brakes by which the brake actuating cam is accurately aligned relative to the brake shoes, deflection of the cam shaft upon the energization of the brakes is eliminated, and in which the motor and actuating linkage is so mounted that danger of injury thereto from road obstacles is eliminated.

A still further object of my invention is to provide an improved brake actuating mechanism mounting structure having these characteristics and which is adaptable to mount the actuating mechanism in various operative positions in accordance with the requirements of the particular installation and which is formed of parts which are interchangeable with like parts of different sizes if necessary.

Another object of this invention is to provide a novel fluid pressure motor mounting bracket structure that is secured directly to the brake supporting spider or backing plate and that can be partially disassembled for servicing, repair, or part replacement without removal of the main bracket portion.

A still further object of the invention is to provide an improved brake actuating mechanism mounting structure supported at the axle outer ends which is adaptable to operatively mount such mechanism in various positions relative to the axle housing to accommodate the mechanism to the varying requirements of different installations.

In its preferred embodiment the invention will be described in conjunction with a drive axle housing although it will be understood that the mechanism can be used with any non-drive axle or axle beam without departing from the spirit of the invention.

These and other objects of the invention will become more fully apparent in connection with the appended claims and as the following detailed description proceeds in reference to the annexed drawings wherein:

Figure 1 is a generally perspective view of the rear end of a vehicle having a worm drive rear axle embodying brake actuating mechanism mounting structure according to the preferred embodiment of the present invention;

Figure 2 is a side elevation in section of the axle of Figure 1 illustrating the brake motor and mounting bracket assembly;

Figure 3 is a fragmentary view, partially in section, illustrating details of the bracket assembly mounted on the spider taken substantially along the lines 3—3 of Figure 2;

Figure 4 is a fragmentary elevation of one end of the spider illustrating the cam shaft bracket attachment portion; and Figure 5 is a section along the line 5—5 of Figure 4 showing, in addition, the relation of the cam shaft support to the spider.

Referring now to the drawings in detail, an axle housing 10 is formed near each end with an integral radially extending brake spider attachment flange 11 (Figures 2 and 3). Secured upon each flange 11, as by a circumferential series of spaced rivets 12 and bolts 12a, is a brake mounting spider 13. A machined pilot shoulder 14 is provided on flange 11, and both spider 13 and flange 11 are provided with a series of mating bolt and rivet receiving apertures which are aligned for reception of the bolts and rivets during assembly. Spider 13, therefore, comprises a substantially rigid radial extension of the flange 11.

A pair of brake shoes 15 and 16 are pivotally mounted on adjacent anchor pins 17 and 18 on the outer side of the spider 13 on the front side of the axle 10. At the rear side of the axle 10, spider 13 is formed with an integral outwardly projecting boss 19 having an aperture 20 which is coaxial therewith and the axis of which is parallel to axle axis. Spider 13 is reinforced by a rib 21 that projects outwardly (Figure 5) and extends along both margins of the spider 13 between boss 19 and the anchor pin mounting portion.

The inner face of spider 13 is formed with an integral trapezoidal inner flange 22 (Figure 4), which flanks boss 19 and which has four tapped holes 23 which, as will appear, match up with similarly spaced holes on the cam shaft support or mounting bracket 24.

Support 24 (Figures 3 and 5) is a rigid hollow tubular body member having an integral spider attachment flange 25 adjacent one end and an integral, generally circular, motor support flange 26 adjacent its other end.

Flange 25 is larger than the tubular body of bracket 24 and in the disclosed embodiment, although not necessarily, is substantially trapezoidal in shape with four corner bosses 27 each having a bolt receiving aperture 28 that aligns with one of the tapped holes 23 in the spider flange 22. Flange 25 is reinforced by opposed integral side webs 29. A plurality of machine screws 30 firmly secure flange 25 to the spider flange 22.

Tubular support 24 is accurately coaxially aligned relative to the aperture 20 of boss 19 by the mating engagement of the piloting annular shoulder 31 projecting from the outer end of bracket 24 beyond flange 25 with a counterbore 31a formed in the adjacent face of spider 13 coaxial with aperture 20.

A motor mount bracket 32, which is of generally plate-like form having a motor mounting flange 33 projecting perpendicularly therefrom at one end and a through aperture 34 at the other end, is firmly mounted upon the inner end of support 24. Support 24 is formed with an annular preferably cylindrical shoulder 35 projecting beyond flange 26 which is received within the circular aperture 34 of motor mount bracket 32 to accurately align the latter transversely relative to the axis of the former. (Flange 26 and bracket 32 are formed respectively with a like plurality of equiangularly spaced bolt receiving apertures 36 and 37 which are spaced at equal radial distances from the coaxial axes of tubular support 24 and aperture 34.) Bracket 32 is suitably fixed to flange 26 by bolt and nut assemblies 38 extending through aligned openings 36 and 37. By this construction, motor mount bracket 32 is accurately aligned longitudinally relative to support 24 and can be fixed thereto in any of a plurality of equiangularly spaced positions. The selected angular position of bracket 32 relative to support 24 will be dependent upon the location of the adjacent parts of the axle stabiliaztion mechanism and the shape of the axle housing, and the motor may be thereby protectively located behind the axle.

A first anti-friction bearing or bushing 40 is provided within the bore of boss 19 and a second anti-friction bearing 42 is provided coaxially within the outer end of tubular support 24. The bearings 40 and 42, which are preferably retainer housed needle bearings, are accurately coaxially aligned relative to each other in the assembly due to the accurate alignment of support 24 relative to boss 19 resulting from the coaction of shoulder 31 with counterbore 31a.

A cam shaft 44, upon the outer end of which is fixed a brake actuating cam or cam head 45 of conventional form, is rotatably received in these bearings 40 and 42. Since both bearings 40 and 42 of cam shaft 44 are supported by the spider 13, shaft 44 is not subject to deflection or misalignment of its bearings upon application of the brakes. Further, bearing 40 being fixed upon spider 13, shaft 44 and cam 45 are accurately positioned relative to the brake shoes 15 and 16 for actuation thereof.

Cam shaft 44 is actuated by a fluid powered motor 46 which is fixed on the flange 33 of bracket 32 by stud and bolt assemblies 48, as is best shown in Figure 2. In the disclosed embodiment, motor 46 is an air motor of the conventional diaphragm type having an internal diaphragm secured to a yoke 50 that functions like a piston rod. Cam shaft 44 is coupled to motor 46 by a lever 52 which is non-rotatably fixed as by splining upon the inner end of cam shaft 44 and which is pivotally connected to yoke 50 at 53.

When the diaphragm rod is reciprocated by fluid pressure differentials acting on the diaphragm within fluid motor 46, such will result in rocking the cam shaft 44 to control relative pivoting of the brake shoes 15 and 16. Thrust washers 55 and 56 are provided respectively between cam 45 and the end of boss 19 on rigid spider 13 and between bracket 24 and crank lever 52, for reducing end play and wear.

Now therefore, a novel mounting assembly has been provided for the air motor 46, cam shaft 44 and operating linkage 50—52 which is easy to install in the correct position on a brake mounting plate or spider and which locates the motor with its position rod axis substantially normal to the axis of the axle, the air motor casing itself being located preferably just to the rear of the bulk of the axle so that it will be protected thereby from injury by objects arising from or upon the road as the vehicle moves forward.

The position of the fluid pressure motor 46 with respect to the undercarriage of the vehicle may be readily changed by removing lever 52 from cam shaft 44 and bolts 38 between brackets 32 and flange 26 and rotating bracket 32 about the axis of the cam shaft 44 to any of the plurality of relative angular positions possible. This feature makes the device readily adaptable to the restrictions of most installations resulting from the varying axle housing and axle stabilization mechanism forms. Thus, in an axle assembly as shown in Figure 1, the brackets 32 can be mounted in such a position that the motors 46 are clear of the anchor arms 60 for lower torque rod 62 and of the projecting portion 63 of axle housing 10 upon which the ends of the leaves of leaf spring 64 rest.

This mounting structure may be used with "banjo" or other types of axles and may be adapted for use in installations having enclosed brake backing plates rather than open spiders for mounting the brake shoes.

The fluid pressure motor 46 may be easily replaced by disconnecting yoke 50 from lever 52 at 53 and disassembling the nut and stud assemblies 48.

The cam shaft 44 may be replaced without disturbing the bracket 32 or support 24 by disconnecting lever 52 therefrom and removing the shaft 44 from the spider side of the assembly.

It will be seen from Figures 1 and 2 that the invention provides a mounting bracket that locates a brake operating air motor in an adjustable operative position away from the frame, spring seats, axle and other parts of the undercarriage of the vehicle. The novel two piece construction of the bracket permits the use of various motor mount bracket 32 with a given length support 24, and various lengths of support 24 may be provided for suitably locating the motor relative to the axle and undergear projections.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, an axle housing, a brake mounting spider fixed to said axle housing adjacent one end thereof, brake shoe pivots on said spider at one side of said housing, a first brake actuating cam shaft bearing mounted on said spider at the side thereof opposite said brake shoe pivots, a longitudinally apertured cam shaft support tube, means removably mounting said tube upon said spider in coaxial alignment with said bearing comprising interfitting pilot portions on the spider and one end of said tube, a second cam shaft bearing within the end of the tube opposite said spider, a motor mounting bracket, means for removably mounting said bracket on the other end of said tube in any of a plurality of positions angularly displaced about the axis of said tube for optimum protective location of said motor on said axle housing, a cam shaft rotatably mounted in said bearings and projecting at its ends from said spider and from said tube, and a motor mounted on said bracket and operatively connected to said cam shaft.

2. In an automotive vehicle, an axle housing, a mounting brake flange rigid with said housing, a brake mechanism support secured to said flange, an apertured boss on said support counterbored at one end, a hollow cam shaft mount separably secured to said brake mechanism support and having a portion interfitting in piloting relation within the counterbore of said boss to establish axial alignment therebetween, axially aligned bearings mounted respectively in said boss and at the opposite end of said cam shaft mount, a cam shaft having a cam head at one end adjacent said boss, said cam shaft extending through said cam shaft support and being journalled in said bearings, and a motor bracket provided with a motor mounting platform secured to said cam shaft mount for locating said platform in a predetermined angularly disposed position with relation to said axle housing.

3. Mounting structure for the brake actuating mechanism of a heavy duty fluid powered cam actuated brake comprising, in combination with an axle housing having a radially projecting brake mounting flange adjacent one end thereof, a spider fixed to said flange and having thereon at one side of said axle a pair of brake shoe pivots, a boss formed on said spider at its side opposite said one side of said axle, said boss being formed with an aperture the axis of which is substantially parallel to that of said axle housing, a counterbore formed coaxial with said aperture in the face of said spider adjacent the center of said axle, a tubular cam shaft support having a radially projecting flange fixed adjacent one end thereof and a cylindrical portion projecting axially beyond said radially projecting flange and interfitting with said counterbore to establish axial alignment therebetween, means rigidly securing said flange to said spider, a plate apertured at one end and formed with a motor mounting flange at the other end, the other end of said tubular support interfitting with the aperture of said plate and said plate being firmly secured to said support, and coaxially aligned cam shaft bearings disposed respectively in the aperture of said boss and the opposite end of said tubular support whereby a cam shaft having a cam head unitary with one end thereof can be journalled in operative relation to the expansible brake shoes of said brakes in bearings which are accurately aligned in all operating conditions.

4. In a brake actuating means adapted to be mounted upon a non-rotatable axle member and embodying a brake mechanism support rigid with said axle member and projecting substantially radially therefrom, means providing a hollow boss on said support, a bearing assembly directly mounted in and to said boss, the axis of said boss being substantially parallel to the length of the axle, a rigid tube removably secured to and projecting from said support longitudinally of the axle, one end of said boss and one end of the tube having interfitting pilot portions for locating said tube concentrically of said boss when the tube is fastened to said support, one of said pilot portions being a counterbore and the other pilot portion being an annular shoulder closely fitted into said counterbore, a second bearing assembly mounted within said tube remote from said boss, a cam shaft actuating motor bracket removably secured to said tube at the end adjacent the second bearing, and a cam shaft extending entirely through said tube and journalled in said bearing assemblies.

5. In brake actuating means adapted to be mounted upon a non-rotatable axle member, a brake mechanism support rigid with said member and projecting generally radially of said axle, means providing a hollow boss on said support, the axis of said boss being substantially parallel to the length of the axle, a first bearing assembly within said boss, a rigid tube removably secured to and projecting from said support longitudinally of said axle, said boss and one end of said tube having interfitting portions for locating said tube concentrically of said boss when the tube is fastened to the boss, a second bearing assembly within the tube remote from said boss, a generally radial flange at the other end of said tube, a motor mounting bracket, means for attaching said bracket to said flange in one of a plurality of different angularly displaced positions about the axis of said tube to locate the motor protectively on said axle member, and a cam shaft extending entirely through said tube and journalled in said bearings with a brake mechanism control cam on one end adjacent said boss.

6. In the combination defined in claim 5, a terminal boss on the end of said tube adjacent said second bearing assembly, and said motor mounting bracket having an aperture in which said boss is disposed with a rotatable fit.

References Cited in the file of this patent

UNITED STATES PATENTS

| 1,728,935 | Jansson | Sept. 24, 1929 |
| 1,899,187 | Eckland et al. | Feb. 28, 1933 |
| 2,409,908 | Simpkins | Oct. 22, 1946 |